UNITED STATES PATENT OFFICE.

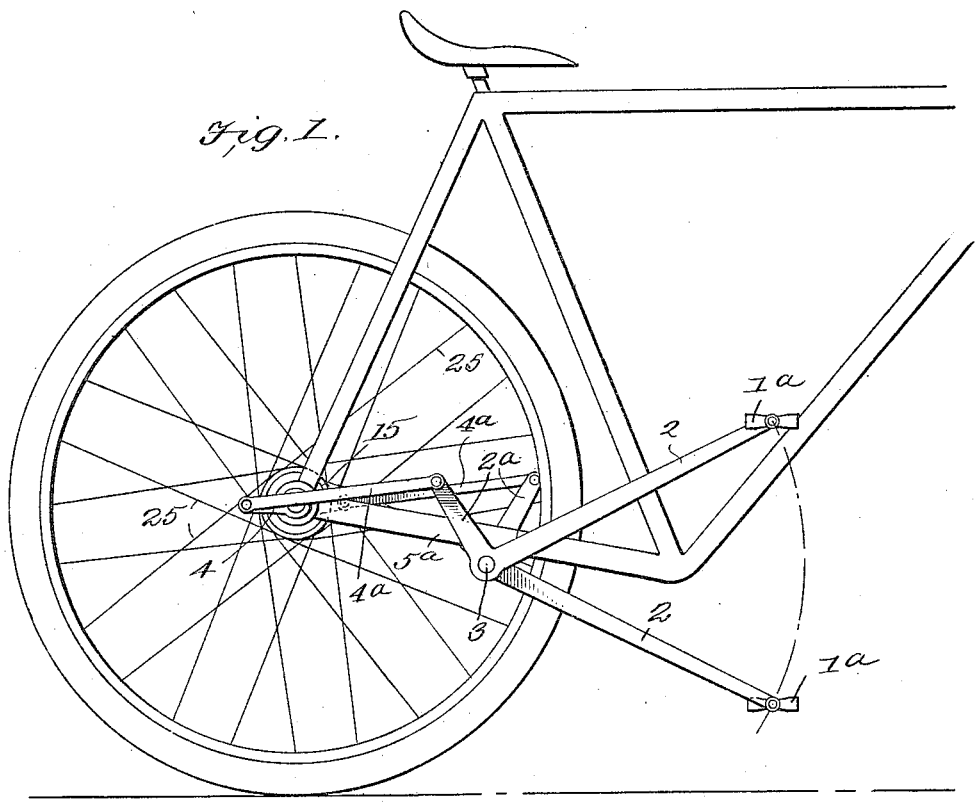
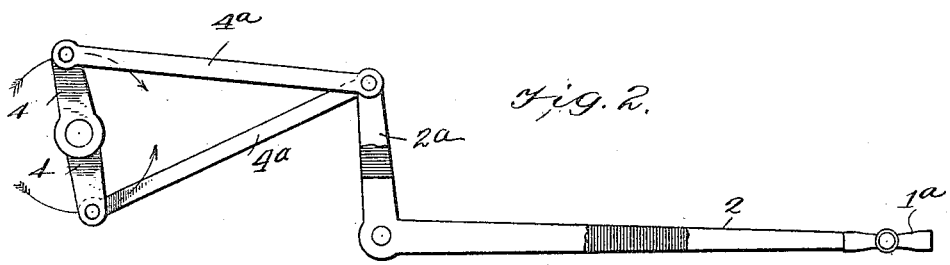

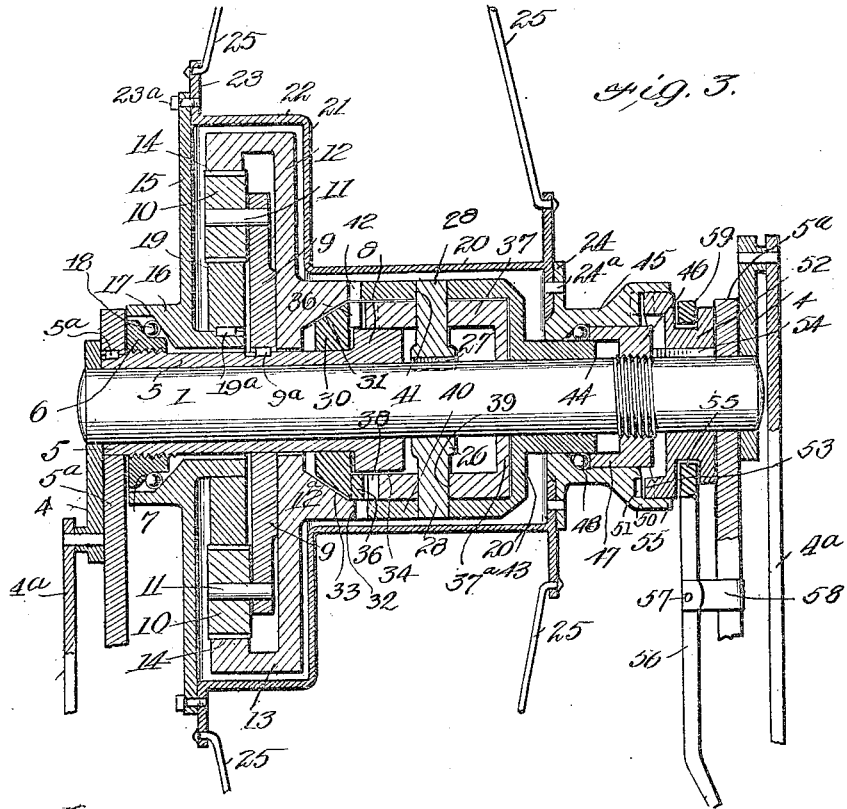
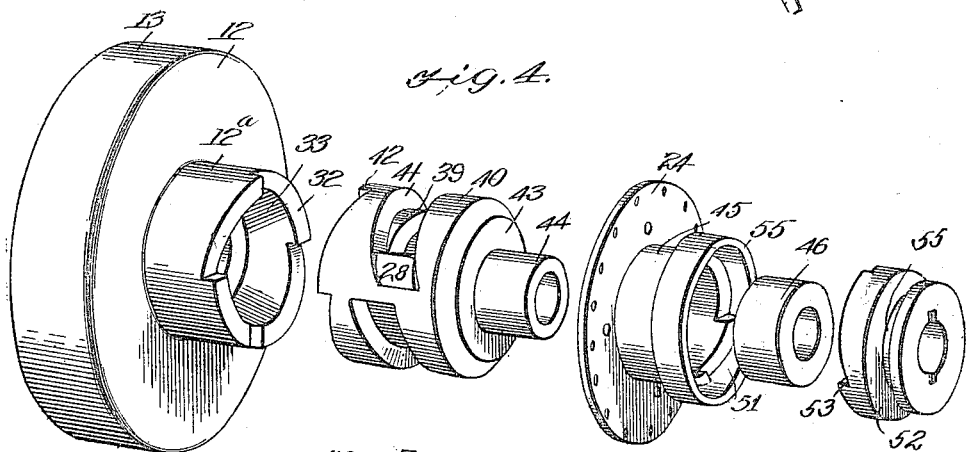
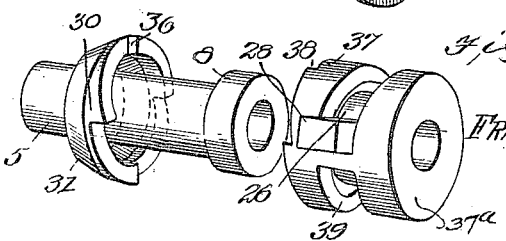

FRANK VEEDER WHITMAN, OF WALKERVILLE, MONTANA.

BICYCLE-GEARING.

1,225,544. Specification of Letters Patent. Patented May 8, 1917.

Application filed January 5, 1911. Serial No. 600,925.

*To all whom it may concern:*

Be it known that I, FRANK VEEDER WHITMAN, a citizen of the United States, and a resident of Walkerville, county of Silverbow, and State of Montana, have invented certain new and useful Improvements in Bicycle-Gearing, of which the following is a specification.

My invention is an improvement in bicycle gearing, and consists in certain novel constructions and combinations of parts hereinafter described and claimed. The object of the invention is to provide an improved transmission of the character specified, and comprising a high speed, a low speed, and a braking mechanism operated by the treadles.

Referring to the drawings forming a part hereof,

Figure 1 is a side view of a portion of a bicycle provided with the improvement.

Fig. 2 is a diagrammatic view of the treadles.

Fig. 3 is a longitudinal vertical section of the improvement.

Fig. 4 is an enlarged perspective view of the transmission with the parts separated, and, Fig. 5 is a similar view of the clutch mechanism.

In the present embodiment of the invention, the rear axle 1 of the bicycle is rotated by means of pedals $1^a$, which are journaled on the forward arms 2 of angle levers $2—2^a$, each lever consisting of arms $2—2^a$ extending at an angle to each other, and the treadles or angle levers are pivoted to the frame of the bicycle at 3. The axle is provided with the radial arms 4 at its ends, arms extending in opposite directions, and each arm is connected to the adjacent arm $2^a$ of the adjacent treadle by means of a link $4^a$.

A sleeve 5 is journaled on the axle near one end, and is rigidly connected to the frame $5^a$ of the bicycle, and a ring 6 having a groove 7 on its inner face, is threaded onto the outer end of the sleeve. The inner end of the sleeve is provided with an integral annular rib 8. A cross head 9 is rigidly secured to the sleeve by means of a key $9^a$ intermediate the ends of the sleeve and a pinion 10 is journaled at each end of the cross head, on a pin 11.

A disk or crown wheel 12 is journaled on the sleeve, between the cross head and the rib, 8, and the said disk or crown wheel provided with a lateral flange 13, having an annular series 14 of internal gear teeth, meshing with the pinions 10. A disk 15 is provided with a hub 16 journaled on the sleeve, 5, the disk forming a part of the gear casing and also forming a part of the wheel.

The outer end of the hub is provided with a groove 17 coöperating with the groove of the ring 6 to form a ball race for receiving an annular series 18 of balls. A gear ring 19 is secured on the inner end of the hub by a key $19^a$, and the teeth of the gear ring mesh with the pinions before mentioned. The transmission mechanism to be described more fully, is inclosed in a casing comprising a cylindrical case 20 having at one end a radial web 21, which in turn is provided with a marginal lateral flange 22, having a radial web 23 which laps upon the adjacent face of the disk 15 and is secured thereto by screw bolts $23^a$.

A disk 24 is journaled on the axle, adjacent to the inner end of the case, and is secured to the case by rivets $24^a$ as shown. The spokes 25 of the wheel are secured to the disk 24 and to the web 23 before mentioned. The case before mentioned forms the hub of the wheel, and the transmission is inclosed in the said hub.

The disk 12 is provided with a laterally extending hub $12^a$, having ratchet teeth 32 on its free end, and the inner surface of the said free end is beveled at 33. A brake ring or cone 30 is journaled on the sleeve 5, and the end of the ring adjacent to the disk 12 is beveled as shown at 31, to coöperate with the bevel 33 of the hub.

The ring or cone encircles the sleeve 5 between the rib 8 of the sleeve and the disk 12 and the opposite end of the ring or cone is provided with ratchet teeth 36. A sleeve 37 is arranged adjacent to the cone or ring 30, the said sleeve having at the end adjacent to the ring or cone a series of ratchet teeth 38, for coöperating with the teeth 36 of the ring or cone. The sleeve is of an internal diameter to fit over the rib 8 of the sleeve 5, and at the end remote from the ratchet teeth the said sleeve has an internal web $37^a$ having an opening for receiving the axle.

The sleeve is also provided with a spiral slot 39 intermediate its ends, and a ring 26 is secured to the axle by a key 27, and is provided with oppositely extending radial arms 28, engaging the slot. A second sleeve 40 incloses the sleeve 37, and the said sleeve 40 is provided with a spiral slot 41 for engagement by the arms. The sleeve 40 is also provided with ratchet teeth 42 for coöperating with the teeth 32 of the hub 12ª of the disk 12.

The sleeve 40 is provided at the opposite end with an internal radial web 43, and with an extension or hub 44 engaging the axle, the said extension or hub extending in the opposite direction to the sleeve. A collar 46 is threaded onto the axle at the end of the hub or extension 44 and the collar is provided with a lateral flange 47 overlying the hub or extension 44.

The hub 45 of the disk 24 fits over the collar, 46, and a ball bearing 48 is arranged between the hub or extension 44, the hub, 45, and the adjacent edge of the flange of the collar.

The low speed clutch is shown at the right of Fig. 3. The hub 45 of the disk 24 is provided with an external annular rib 50, and the end of the hub is counterbored and provided with ratchet teeth 51.

A collar 52 is journaled on the axle adjacent to the hub, and the end of the collar is provided with ratchet teeth 53 for engagement by the teeth 51 of the hub. The collar is slidable on a feather 54 on the shaft, and is provided with an external annular groove 55.

A lever 56 is pivoted at 57 on a bracket 58 on the frame, and the free end of the lever is in position for engagement by the foot of the rider. The other end of the lever is forked at 59, and the arms of the fork are engaged with the groove 55.

When the collar is clutched to the hub, the axle is connected directly to the wheel, and a slight movement of the lever is all that is necessary to operate the clutch.

The operation of the improvement is as follows:

When it is desired to run on the high speed, the low speed clutch is disconnected, by moving the lever 56 in a direction to disengage the element 52 from the element 45. By means of the pedals the rider now rotates the axle 1 rearwardly, and this movement of the axle causes the element 40 to move toward the wheel. The cross head 28 moves with the axle rearwardly, that is, with the upper end of the cross head moving away from the observer in Fig. 3, and the element 40 engages with the element 12ª, turning the wheel 12 rearwardly and the wheel 19 forwardly.

Since this gear wheel 19 is rigid with the wheel of the bicycle, the bicycle will move forwardly. When now, the rider desires to coast, he will check the rearward movement of the axle, moving the cross head 28 slightly forwardly, and the sleeve 40 will be moved away from the hub 12ª of the wheel 12, disengaging the teeth 42 from the teeth 32, and the bicycle will coast freely. If he should now desire to apply the brake, he will move the axle forwardly, and this movement will move the element 37 toward the element 30, and the element 30 will be moved into close contact with the internal conical surface of the hub 12ª, thus braking the action of the wheel.

The tightness of the setting of the brake depends upon the extent of the forward movement of the axle. To apply the brake loosely the axle is moved forwardly just a little, while to apply it tightly, the axle is moved forward to a greater extent. When propelling the vehicle forwardly on the high speed the axle rotates in the reverse direction, but this is immaterial, since the operator moves the pedals in precisely the same manner, whatever the direction of motion of the axle.

In coasting, the crown wheel is disconnected from the axle, if traveling on the high speed, by a slight rearward movement of the axle, with respect to the transmission, that is, the axle is held temporarily, thus pressing the sleeve 40 away from the disk 12, or, if traveling on the low speed, the lever 56 is moved to disconnect the collar 52 from the hub.

The axle is now free from the wheel, and the parts remain in this position until the axle or lever is again shifted. The mechanism is simple, and operates easily, and without noise. The case may be filled with lubricant, and the transmission is perfectly protected from the entrance of foreign substances by the case.

It will be observed that the slot or cam track 41 is the direct opposite of the slot or cam track 39, the former being in the driving clutch while the latter is in the brake clutch. This arrangement prevents the clutches operating in the same direction, since they must move in opposite directions when the arms 28 are moved with respect to the said slots.

When both pedals are at half stroke both clutches are inoperative, this position of the parts permitting the wheel to run free, as in coasting.

It will be noticed that the disk 9 is keyed to the sleeve 5 by a key 9, and the sleeve 5 is secured to the bicycle frame by means of the key 5ª in Fig. 3. The gear ring 19 is keyed to the hub 16, by means of a key 19ª. The slots in the sleeves 37 and 40 are oppositely arranged, so that when the axle is oscillated, the cross head 28 will move the said sleeves in opposite directions, so that when the sleeve 37 is clutched to the ring 34, the sleeve 40 is released from the hub 12ª. When the axle is rotated rearwardly with the sleeve 40 clutched to the disk 12, the said disk 12 is also rotated rearwardly.

The rearward rotation of the disk 12 rotates the pinions 10, which drive the gear ring 19 and the rear wheel forwardly on the high speed, the disk 9ª being rigidly connected with the bicycle frame.

To permit the bicycle to coast, sufficient pressure is exerted on the pedals to check the axle. The forward movement of the ring or sleeve 40 with respect to the cross head 28 disengages the teeth 42 of the sleeve 40 from the teeth 32 of the hub 12ª of the disk 12, thus releasing the connection between the axle and the said disk. This movement of the rear axle is not sufficient to seat the brake however, so that the wheel rolls free from the axle. To apply the brake, a movement of the axle as just described, engages the brake sleeve 37 with the teeth of the ring 30, and forces the beveled edge 31 of the ring into braking engagement with the inner surface of the hub 12ª.

To run on the low speed, the sleeves 37 and 40 are disengaged in the manner just described, so that the rear wheel is free from the axle. The lever 56 is now operated to clutch the collar 52 to the hub. The axle is now connected directly with the hub, so that the forward movement of the axle is transmitted as forward movement to the wheel. The disk 12 is free, and the said disk is rotated rearwardly through the engagement of the pinions therewith. The rotation of the disk however, does not affect the wheel, nor any of the mechanism other than the disk itself.

I claim:

1. In a bicycle, the combination with the rear axle, of a two part casing forming a hub for the rear wheel in which the axle is journaled, a sleeve journaled on the axle at one end and rigid with the frame, a cross head fixed on the sleeve, a pinion journaled at each end of the cross head, a gear ring rigid with the hub with which the pinions mesh, a crown wheel having a hub journaled on the sleeve and meshing with the pinions, the hub of the said wheel having its end internally beveled, and having clutch teeth at the said end, a brake ring having the end adjacent to the crown wheel beveled and coöperating with the beveled surface of the said wheel, a plurality of concentric sleeves journaled on the axle, each sleeve having the end adjacent to the crown wheel provided with clutch teeth for coöperating with the teeth of the brake ring and of the crown wheel hub, respectively, each sleeve having a spiral slot intermediate its ends, the slots of the respective sleeves being oppositely arranged, a pair of oppositely arranged arms extending radially from the axle and engaging the slots, the hub of the rear wheel having clutch teeth at the end remote from the crown wheel, a collar slidable on the axle and keyed thereto, and having clutch teeth coöperating with the teeth of the hub, means for operating the collar, and means to turn the axle.

2. In combination with the rear axle and the rear wheel, of a hub for the rear wheel journaled on the axle and having clutch teeth at one end, a collar having clutch teeth for coöperating with the teeth of the hub slidable on the axle and keyed thereto, means for shifting the collar, a cross head rigid with the frame of the bicycle, a gear ring rigid with the hub adjacent to the cross head, a pinion journaled at each end of the cross head and meshing with the gear ring, a crown wheel journaled on the axle and meshing with the pinions, said wheel having a hub provided with a beveled inner surface and having a series of clutch teeth at the end of the hub, a brake ring on the axle having a beveled end for coöperating with the crown wheel, and having clutch teeth at the other end, a plurality of concentric sleeves on the axle, each having clutch teeth at the end adjacent to the crown wheel for coöperating with the teeth of the said wheel and of the brake ring, respectively, each of the said sleeves having a spiral slot, the slot of the sleeves being oppositely arranged, radial arms on the axle engaging the slots and means whereby the axle may be moved angularly for moving the sleeves in opposite directions when the arms are moved angularly.

3. In combination with the rear axle and the rear wheel, of a hub for the rear wheel journaled on the axle and having clutch teeth at one end, a collar having clutch teeth for coöperating with the teeth of the hub slidable on the axle and keyed thereto, means for shifting the collar, a cross head rigid with the frame of the bicycle, a gear ring rigid with the hub adjacent to the cross head, a pinion journaled at each end of the cross head and meshing with the gear ring, a crown wheel journaled on the axle and meshing with the pinions, said wheel having a hub provided with a beveled inner surface, and having a series of clutch teeth at the end of the hub, a brake ring on the axle having a beveled end, for coöperating with the crown wheel, and having clutch teeth at the other end, a plurality of concentric sleeves on the axle, each having clutch teeth at the end adjacent to the crown wheel, for coöperating with the teeth of the said wheel and of the brake ring, respectively, and a connection between the sleeves and the axle for moving said sleeves longitudinally and in opposite directions when the axle is moved angularly with respect to the sleeves.

4. In combination with the rear axle and the rear wheel, of a hub for the rear wheel journaled on the axle and having clutch teeth at one end, a collar having clutch teeth for coöperating with the teeth of the hub slidable on the axle and keyed thereto, means for shifting the collar, a cross head rigid with the frame of the bicycle, a gear ring rigid with the hub adjacent to the cross head, a pinion journaled at each end of the cross head and meshing with the gear ring, a crown wheel journaled on the axle and meshing with the pinions, a sleeve on the axle, said sleeve and crown wheel having interengaging clutch parts, a connection between the sleeve and the axle for moving said sleeve toward and from the crown wheel when the axle is moved angularly with respect to the sleeve, a braking device for the crown wheel, and means for operating said device simultaneously with the sleeve and in the opposite direction.

5. In a bicycle, a rear axle, means for rotating the axle, a wheel having a hub encircling the axle, a gear ring rigid with the hub, a fixed bar rigid with the frame, a pinion on each end thereof and meshing with the gear ring, an internal gear meshing with the pinions, a clutch for connecting the internal gear to the axle, and means operated by the angular movement of the axle for operating the clutch.

6. In a bicycle, a rear axle, means for rotating the axle, a wheel having a hub encircling the axle, a gear ring rigid with the hub, a fixed bar rigid with the frame, a pinion on each end of the bar meshing with the gear ring, an internal gear meshing with the pinions, and means operated by the angular movement of the axle in one direction for connecting the internal gear therewith.

7. In a bicycle, a rear axle, means for rotating the axle, a wheel having a hub encircling the axle, a gear ring rigid with the hub, a fixed bar rigid with the frame, a pinion on each end thereof and meshing with the gear ring, an internal gear meshing with the pinions, a brake for the internal gear, means operated by the angular movement of the axle in one direction for connecting the internal gear with said axle, and means operated by the angular movement of the axle in the opposite direction for operating the brake.

8. In a bicycle, a rear axle, means for rotating the axle, a wheel journaled on the axle, a gear wheel rigid with the wheel, a fixed bar on the frame, a pinion on each end of the bar meshing with the gear wheel, an internal gear meshing with the pinions, means operated by the angular movement of the axle in one direction for connecting the internal gear therewith, a brake mechanism for the internal gear, means operated by the angular movement of the axle in the other direction for operating the brake mechanism, and means for directly connecting the axle to the wheel.

9. In a bicycle, a rear axle, means for rotating the axle, a wheel journaled on the axle, a gear wheel rigid with the wheel, a fixed bar on the frame, a pinion on each end of the bar meshing with the gear wheel, an internal gear meshing with the pinions, means operated by the angular movement of the axle in one direction for connecting the internal gear therewith, a brake mechanism for the internal gear, and means operated by the angular movement of the axle in the other direction for operating the brake mechanism.

FRANK VEEDER WHITMAN.

Witnesses:
O. H. GOLDEN,
BEN SPECKBACHER.

Copies of this patent may be obtained for five cents each, by addressing the "Commissioner of Patents, Washington, D. C."